Patented Oct. 15, 1946

2,409,276

UNITED STATES PATENT OFFICE 2,409,276

COMPOSITIONS COMPRISING BLOWN TERPENIC PRODUCTS AND VINYL POLYMERS AND METHOD OF MAKING

Mortimer T. Harvey, East Orange, N. J., assignors to Harvel Research Corporation, a corporation of New Jersey No Drawing. Application August 1, 1941, Serial No. 405,073

11 Claims. (Cl. 260—36)

The present invention relates to compositions of matter which comprise blown terpenic products and vinyl polymers in which compositions the oxidized terpenes serve as a plasticising solvent for the vinyl polymers.

The compositions of the present invention can be used as such, for example, as films, coatings, paints and varnishes for electrical insulation, for protective coatings, for decorative coatings and so on where they are applied with a volatile thinner or solvent which is removed by evaporation after application and as extruded shapes such as tubing for electrical insulation, for woven textiles and for general use where they are used in the dry state. And the compositions of the present invention can be used in or with other materials, for example, with artificial rubbers of the "Thiokol" "Duprene" and "Buna" types to impart desired characteristics which are inherently lacking in the artificial rubber.

An object of the present invention is to provide a plasticizer, or plasticising solvent, for vinyl polymers whereby the vinyl polymers are modified to produce dry compositions having rubber-like flexibility and resiliency.

Another object of the present invention is to provide a modifying agent for vinyl polymers whereby the resulting compositions can be used in artificial rubbers of the "Buna" or butadiene types and other types, including "Thiokol" and "Duprene" to impart to said artificial rubbers characteristics which are inherently lacking.

Another object of my invention is to provide a plasticiser for vinyl polymers which plasticiser can be used in comparatively large amounts or proportions, with respect to the amount of vinyl polymer used, and yet obtain a "dry" composition in which the plasticiser is held in and from which there is no bleeding of the plastiser, such large proportion being, for example, as high as six parts of the plasticiser to one part of the vinyl polymer, by weight.

The present application is a continuation in part of my copending application Serial Number 382,740, filed March 11, 1941.

Illustrative examples of substances which can be blown to produce material suitable for the practice of the present invention are methyl abietate ($C_{19}H_{29}COOCH_3$), known on the market as "Abalyn," ethyl abietate, decyl abietate, phenyl abietate and the other hydrocarbon abietates, turpentine, pinene, pine oil, terpineol, dipentine, (limonene, for example), eucalyptol (as oil of eucalyptus) and cedrene (in cedar wood oil). Of the substances mentioned in this paragraph, the present invention is particularly concerned with the various terpenes by which term are meant unsaturated, non-aromatic hydrocarbons of the formula $(C_5H_8)n$, where $n$ is an integer greater than 1, as well as essential oils consisting largely of such hydrocarbons. To cover such essential oils, as for example, cedar wood oil, as well as the individual terpenes, the all-embracing term "terpene oils" will be used.

The method of oxidation particularly described is given for illustration and is by blowing but other methods such as spraying the liquid through an atmosphere of air or oxygen or flowing the liquid down inclined surfaces in an atmosphere of air or oxygen can be used. By the term "blown" as applied to any one of said substances in this specification and claims is meant the product produced by subjecting the product to free oxygen to thicken the same. This may be done by following any one of the aforesaid specific methods of blowing, spraying or cascading as heretofore set forth.

Method for oxidation

The oxidation can be done by placing the liquid material to be oxidized (the terpenic products in liquid state) in a closed container having a conduit extending thereinto to a point near the bottom, with openings in the conduit for releasing air or oxygen below the surface of the liquid therein. A vent is provided for releasing the air or oxygen to prevent too great pressure being built up and to allow the air or oxygen to circulate through the liquid. A stirrer is used to agitate the liquid being oxidized and thereby to increase the contact of the liquid with the air or oxygen. And heating of the liquid during blowing is provided. In the illustrative method the blowing is provided. In the illustrative method the blowing was done by air by the apparatus and method described in this paragraph and at between about 160° F. and about 195° F. for about twenty-four hours, the air when it reached the treating apparatus being at normal or room temperature. Rapid stirring of the liquid during blowing was produced by revolving blades or paddles. The volume of liquid put in the vessel was about one-quarter of the capacity of the vessel so that advantageous contact with the air was produced by the stirring.

By the term "terpenic products" as employed in this specification and claims, is meant the class of products consisting of turpentine, pinene, pine oil, terpineol, dipentine, eucalyptol (as oil of eucalyptus) and cedrene (in cedar wood oil).

Uses

The blown or oxidized terpenic products of the present invention are useful in the arts generally, and are useful particularly, for example, (1) for putting vegetable oils into solution with cellulose nitrate, (2) as solvents for materials such as resins of the glycerol-aldehyde resins, vegetable oils, cellulose nitrate, cellulose acetate and ethyl cellulose, (3) plasticising rubber, (4) floatation of ores, and (5) aiding the solvent properties of soaps.

Another use is as a mutual solvent for artificial rubbers of "Buna" type and vinyl resins.

The term "Buna" as used herein is intended to mean certain synthetic materials made from butadiene, with or without other materials, by polymerization or copolymerization, to produce artificial rubber materials, for illustrative examples, those known as and sold under the names of "Buna," "Buna S," and "Perbunan" ("Buna N"). "Buna" is a straight butadiene polymer; "Buna S" is a copolymer of butadiene and styrene; and "Perbunan" ("Buna N") is a copolymer of butadiene and acrylonitrile; and the term "Buna" as used herein is intended to cover also other butadiene polymers and copolymers of the "Buna" type including products obtained by various polymerization methods and steps and products obtained by copolymerising various proportions of materials such as various proportions of styrene and butadiene or of acrylonitrile and butadiene and products obtained by copolymerizing other or different materials with butadiene such as copolymerizing coumarone or indene with butadiene and to cover generally artificial rubbers which are butadiene polymers or copolymers.

The term vinyl polymer is used to designate polymers of vinyl esters such as polymerized vinyl chloride, polymerized vinyl acetate, copolymers of vinyl chloride and vinyl acetate, polymerized vinyl chloroacetate and other polymerized vinyl esters. These range in consistency from the liquid state to solid resin-like products depending on the material and on the degree or extent to which they are polymerized and are used in the practice of the present invention in their various states according to the use to which they are to be applied and to the suitability of their consistency to the method of handling required in putting them to use. For a number of uses such as in getting rubber-like gels with the "mutual solvent," before the "Buna" type rubber is incorporated, vinyl polymers having molecular weights between 20,000 and 30,000 are preferred. "Vinylite-vyn w" has a molecular weight of about 24,000 and "Vinylite qyna" has a molecular weight of from about 20,000 to about 22,000.

The mutual solvent or mutually compatible vehicle for the "Buna" and the vinyl polymer of the present invention is a material which will serve to make the "Buna" and the vinyl polymer compatible with each other and bring them together into a workable composition and at the same time will not act deleteriously when the composition is handled and worked into more advanced and final states (as, for example, by vulcanization through heating) but will remain a part of the final composition either in its original form or in some intermediate or final form.

Below is a table showing characteristics of mixtures of the starting solvents with a "Vinylite" resin and of oxidized solvents with the same "Vinylite" resin. The proportion is five parts by weight of solvent (or oxidized solvent) to one part of "vinylite" resin. The "Vinylite" resin used in each case is "Vinylite vyn w."

| Product mixed 5 to 1 with "vyn w" | Characteristics of prod. mixed with "vyn w" | | | Characteristics of the mixtures | |
|---|---|---|---|---|---|
| | pH | Sp. gr. at °C. | Cent. viscosity | Color | |
| Turpentine | 7 | 0.864/25 | 15.2 | Water clear | Insoluble. |
| Blown turpentine | 4 | 1.027/25 | 229 | Clear brown | Soluble. |
| "Abalyn" | 7 | 1.035/25 | 4,400 | Light yellow | Soluble, bleeds. |
| Blown "Abalyn" | 7 | 1.089/29 | Semi-solid | do | Soluble. |
| Pine oil | 7 | 0.936/25 | 28.5 | do | Soluble hot, comes out cold. |
| Blown pine oil | 4 | 1.010/25 | 664 | Brown green | Partly sol. bleeds. |
| Dipentene | 7 | 0.848/21 | 14.2 | Water clear | Insol. |
| Blown dipentene | 3–4 | 0.993/21 | 38 | Clear brown | Readily sol. bleeds. |
| Eucalyptus oil | 6 | 0.878/27 | 16.1 | Yellow clear | Soluble bleeds. |
| Eucalyptus oil, blown | | 1.02/29 | Very heavy liquid | Opaque | Soluble. |
| Cedar wood oil | 6–7 | 0.957/26 | 37.0 | Yellow clear | Insoluble. |
| Cedar wood oil, blown | 5–6 | Heavier than water | 300,000+127 | Opaque | Soluble. |

The viscosity in each case was taken at the temperature shown for the corresponding specific gravity, and the factor of 4.75 used to multiply the time in seconds of the flow of the liquid by the centipoise method. The specific gravity was taken with the hydrometer in each case except in the case of "blown" "Abalyn" where it was taken with the pycnometer. pH values were taken with Fischer pH paper.

Each of the "blown" solvents in the above table was oxidized by the illustrative method described above for oxidizing terpenes and below are given examples of (1) a gel-like composition of blown turpentine and a vinyl ester and (2) a "Buna" rubber mixture containing the gel-like compositions. Each of the other "blown" solvents in the above table can be substituted for all or any of the "blown" turpentine in the following examples.

*Example 1.*—A. One hundred parts by weight of the "blown" turpentine described above are heated to from about 150° C. to about 165° C. and twenty-five parts of polymerized vinyl chloride, known on the trade as "vinylite qyna," having a molecular weight of from about 20,000 to about 22,000, are added and stirred until solution takes place. This is cooled and ready for various uses. When cooled, this product is a rubbery mass, and is a gel, and can be milled into the "Buna" type artificial rubber, above identified, to improve aging, tear resistance and other physical properties.

B. To a batch of the product described, in paragraph A, above, one hundred and twenty-five parts of "Buna S" were added and milled together on rubber-mixing rolls, together with nine parts of zinc oxide, five parts of "Aminox," eight parts of "Tuads," and one hundred and ten parts of "Gastex." This produces a "rubber" batch suitable for formation into various shapes which can be vulcanized, for example, at 150° C. for about fifteen minutes in a pressure mold.

The examples of 5:1 mixtures of "blown" solvents disclosed above are given as illustrations of the practice of the present invention, and these mixtures are suitable for mixing into "Buna" type artificial rubbers to give desirable characteristics to the latter. Some of the above mixtures are substantially dry to the touch, others are tacky and still others are wet on the surface and some of the "wet" bleed to greater or less extent. All of them are gel-like in consistency and mill easily into rubber on rubber mixing rolls, and can be made up into vulcanizable "rubber" compositions similar to that given in Example 1B above by substituting any of the "blown" terpene products disclosed above or any mixture of two or more of them for all or any part of the "blown" turpentine of Example 1, above. Also, in each case any of the preferred "Vinylite" resins can be used in place of "Vinylite qyna" and any of the "Buna" type artificial rubbers can be used in place of the "Buna S" of the examples. The proportions of ingredients in the "rubber" mixture are illustrative and variations can be made in practising the art of compounding of "Buna" rubber compositions and any of the mixtures of any of the preferred "Vinylite" resins described herein with any of the oxidized terpenes of the present invention can be used in any of the "Buna" rubber compositions described in my copending application Ser. No. 382,740.

Also for some purposes, whether for general use or for making "Vinylite" gels for general use or for use in "Buna" rubbers the terpene products can be oxidized (as by blowing with air or otherwise) while they are in mixtures with other materials such as terpenes-$CH_2O$ reaction products. For example, a mixture of equal parts by weight of methyl abietate and a condensation of $CH_2O$ and turpentine was blown by the method above described, also a mixture of equal parts of rosin and a condensation product of $CH_2O$ and turpentine; a mixture of equal parts of turpentine and $CH_2O$-turpentine reaction product; and a mixture of equal parts of pine oil and $CH_2O$-turpentine reaction product was blown by the same manner. In other cases $CH_2O$-terpene reaction products were blown with each of the unreacted terpenes named herein in proportions ranging from 10 to 1 on one side to 1 to 10 on the other side, giving useful products.

Any of the oxidized solvents of the present invention can be heated to remove light volatiles therefrom before mixing with the selected "Vinylite" resin to get desired states of dryness, tackiness or wetness to serve the purpose of its desired use. For example blown "Abalyn" was heated up to 240° C. to remove 10% of its weight and blown dipentene was heated to remove 20% of its weight and in each case they gave dry gel-like mixtures with the "vyn w" in the proportions of 5 to 1 respectively. Also various proportions of oxidized terpene-$CH_2O$ reaction product to "Vinylite" resin can be used to serve desired purposes, for example, from about one part to about ten parts of the said oxidized terpene-$CH_2O$ reaction product to about one part of the "Vinylite" resin.

The following trade-mark names or trade names are identified as follows: "Gastex" and "P-33" are carbon blacks; "Speedon," "Altax" and "Tuads" are vulcanization accelerators; and "Aminox" is an antioxidant.

In the examples above the following can be substituted for all or any part of the "Vinylite vyn w" wherever that is used: "Qyna" which is polymerized vinyl chloride; "vyn s" which is a copolymer of ninety parts of vinyl chloride and ten parts of vinyl acetate; "vyn f" which is a copolymer of eighty-seven parts of vinyl chloride and thirteen parts of vinyl acetate; "xyfg" which is polyvinyl butyral, formed by treating polyvinyl alcohol with butyric aldehyde to give an acetal called polyvinyl butyral which is soluble in butyl alcohol and having a high tensile strength.

An advantage of the compositions of the present invention is that they have a greatly improved tear strength or resistance as compared with similar compositions made of "Buna" type artificial rubber without the vinyl polymers.

In addition to illustrating the method of bringing artificial rubber of the "Buna" type into solution or compatibility with vinyl polymers, these examples also illustrate the use of these solutions of "Buna" type artificial rubber with vinyl polymers in "rubber" mixtures or compositions suitable for molding by heat and pressure or suitable for sheeting in calender or sheeting rolls and for general use to which rubber compositions can be placed.

The "Buna"-polyvinyl resin-mutual solvent compositions of the present invention can be vulcanized with sulphur alone or with various other vulcanizers and can be used generally in the manner of rubber mixes as illustrated above in the examples given.

According to the present invention butadiene artificial rubbers are made to have characteristics and qualities which they do not have of themselves and this by the addition of comparatively small quantities of polyvinyl resins having high molecular weights, that is of the order of from about 20,000 to about 40,000, the addition being made through the medium of a mutual solvent which is non-volatile up to at least 150° C. A number of the mutual solvents disclosed herein do not have boiling points at normal pressures and cannot be distilled at normal pressures without decomposition.

General examples of compositions of the present invention which illustrate the ratios of polyvinyl ester, butadiene artificial rubber and mutual solvent are as follows:

|  | Parts by weight | | |
| --- | --- | --- | --- |
|  | A | B | C |
| Butadiene artificial rubber | 50 | 75 | 90 |
| Polyvinyl ester | 10 | 5 | 2 |
| Mutual solvent | 40 | 20 | 8 |

Generally the ratio of butadiene artificial rubber to polyvinyl ester can be stated to range from about 50 to 1 to about 2 to 1, and the ratio of mutual solvent to polyvinyl ester to obtain a gel-like product can be stated to range from about 10 to 1 to 1 to 1. For melting the mutual solvent and polyvinyl resin together the range is from about 10 to 1 to about 2.5 to 1, and in the ratios from about 2.5 to 1 to about 1 to 1 the two ingredients can be brought together by milling them into each other on rubber mixing rolls, the products along the whole range (10 to 1 to 1 to 1) being rubber-like gels.

Having thus described my invention, what I claim and desire to protect by Letters Patent is:

1. The method which comprises heating together from about one part to about ten parts by weight of a blown terpenic product with one part of a polyvinyl ester to form a gel when cold.

2. A rubber-like composition comprising a polyvinyl ester having a molecular weight between about 20,000 and about 40,000 and a blown terpenic product.

3. A composition of matter comprising butadiene artificial rubber, a polyvinyl ester having a molecular weight of at least 20,000, and a mutual solvent which is non-volatile up to 150° C., said butadiene artificial rubber being present in amount at least 50% by weight of the total of the three said components, and said mutual solvent being a blown terpenic product.

4. A rubber-like composition comprising a polyvinyl ester having a molecular weight between about 20,000 and about 40,000, a blown terpenic product and a butadiene artificial rubber.

5. A composition of matter comprising butadiene artificial rubber, a polyvinyl ester having a molecular weight of at least 20,000, and a mutual solvent which is non-volatile up to 150° C., the ratio of said butadiene artificial rubber ranging from 2 to 50 parts for each part by weight of said polyvinyl ester, said mutual solvent being a blown terpenic product.

6. The method of making a compatible mixture of a butadiene artificial rubber and a polyvinyl ester which comprises mixing said polyvinyl ester at about 150° C. with a material which is a mutual solvent for said polyvinyl ester and said butadiene artificial rubber to form a gel, said mutual solvent being a blown terpenic product, the boiling point of said mutual solvent being at least as high as the mixing temperature, and then mixing in said artificial rubber.

7. A gel of a polyvinyl ester and a blown terpenic product, which said gel is compatible with butadiene artificial rubber.

8. A rubber-like composition comprising a polyvinyl ester having a molecular weight between about 20,000 and about 40,000 and blown turpentine.

9. A rubber-like composition comprising a polyvinyl ester having a molecular weight between about 20,000 and about 40,000, blown turpentine and a butadiene artificial rubber.

10. A composition of matter comprising butadiene artificial rubber, a polyvinyl ester having a molecular weight of at least 20,000, and a mutual solvent which is non-volatile up to 150° C., the ratio of said butadiene artificial rubber ranging from 2 to 50 parts for each part by weight of said polyvinyl ester, said mutual solvent being blown turpentine.

11. A gel of a polyvinyl ester and blown turpentine, which gel is compatible with butadiene artificial rubber.

MORTIMER T. HARVEY.